United States Patent [19]

Specht

[11] Patent Number: 4,856,633

[45] Date of Patent: Aug. 15, 1989

[54] WHEEL HUB ASSEMBLY

[76] Inventor: Victor J. Specht, Kohl's Transmission, 44 Mildred, Fort Myers, Fla. 33901

[21] Appl. No.: 175,959

[22] Filed: Mar. 31, 1988

[51] Int. Cl.[4] .............................................. F16D 11/04
[52] U.S. Cl. .................................... 192/67 R; 192/49; 403/1
[58] Field of Search ..................... 192/67 R, 49; 403/1

[56]  References Cited

U.S. PATENT DOCUMENTS

| | | |
|---|---|---|
| 2,883,025 | 4/1959 | McKim . |
| 3,123,169 | 3/1964 | Young et al. . |
| 3,442,361 | 5/1969 | Hegar . |
| 4,147,226 | 4/1979 | Kleespies . |
| 4,266,646 | 5/1981 | Telford .............................. 403/1 |
| 4,538,714 | 9/1985 | Kagata et al. ........................ 403/1 |
| 4,621,723 | 11/1986 | Carlson ................................ 192/71 |

FOREIGN PATENT DOCUMENTS

| | | | |
|---|---|---|---|
| 691321 | 7/1964 | Canada ............................. | 192/67 R |
| 1138357 | 12/1982 | Canada ................................... | 403/1 |
| 0146303 | 11/1979 | Japan ........................................ | 403/1 |
| 0014627 | 2/1981 | Japan ............................... | 192/67 R |

Primary Examiner—Leslie A. Braun
Assistant Examiner—Andrea Pitts
Attorney, Agent, or Firm—Dykema Gossett

[57] ABSTRACT

A wheel hub assembly comprises a spindle including a shank having a first longitudinal spline, a threaded portion and a mount flange adapted for connection to a vehicle drive train. A cylindrical wheel hub adapted to mount a wheel is coaxial of and surrounds the spindle. Bearings are interposed between the spindle and wheel hub supportably and retainingly engaging the hub. A fastener upon the threaded portion retainingly engages the bearings, retaining the hub against endwise movement. A second spline upon the interior of the hub is spaced from the first spline, and a drive key having inner and outer longitudinal splines thereon is interlocked with the first and second splines respectively, whereby the spindle the hub rotate in unison. The key is adapted to transmit a drive torque from the spindle to the hub. On removal of the drive key, the hub is journaled upon the spindle for free rotation independently of the spindle.

28 Claims, 3 Drawing Sheets

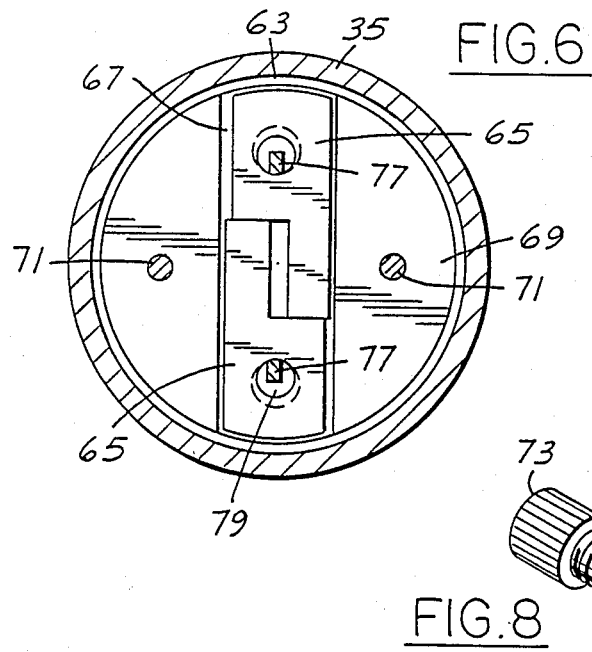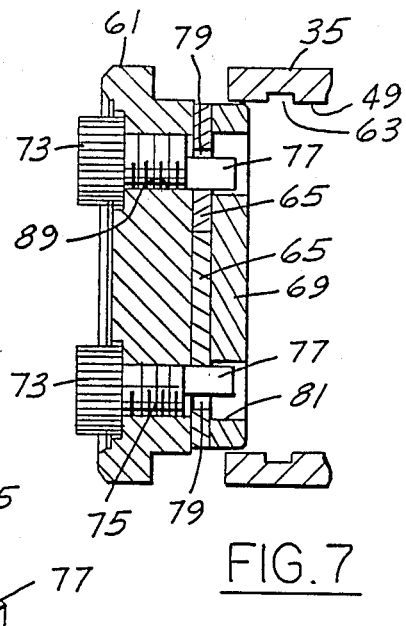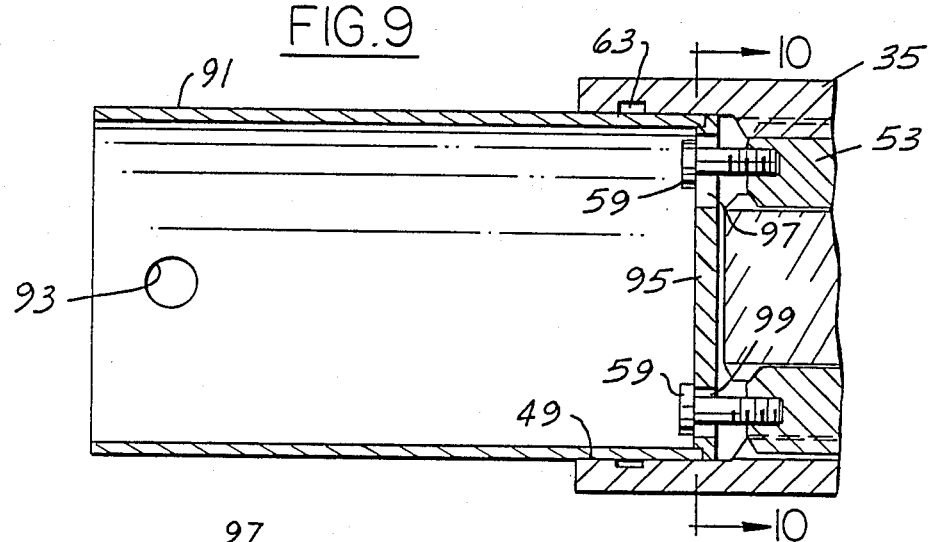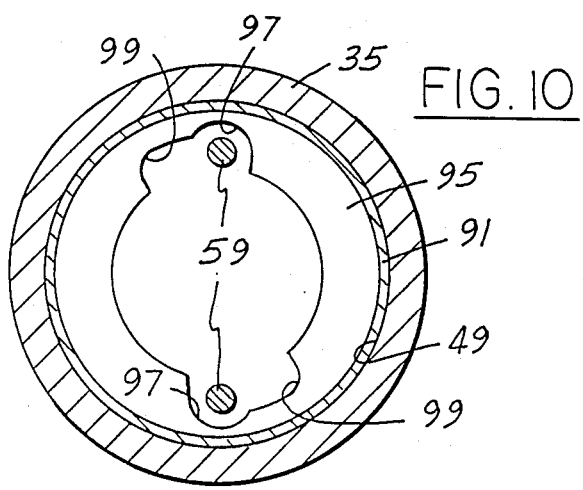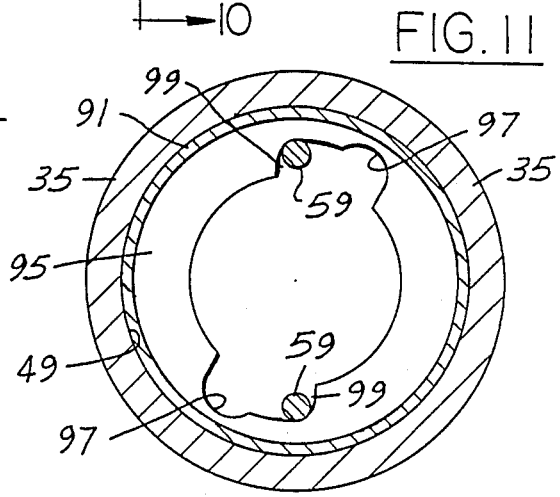

WHEEL HUB ASSEMBLY

FIELD OF INVENTION

This invention relates to automobiles, trucks and vehicles and more particularly to a wheel hub assembly for mounting and for journaling a vehicle wheel upon a spindle connected to a vehicle drive train for rotation in unison. There is a separable connection between the spindle and wheel hub so that the hub and spindle will rotate independently of each other when the vehicle is towed, to prevent damage to the drive train. Specifically, the wheel hub assembly may be adapted to any vehicle whether front wheel or rear wheel drive automobile or truck.

BACKGROUND OF THE INVENTION

If a vehicle must be towed, there is a possibility of potential drive line damage from the vehicle axle shaft through the drive line and automatic transmission. Presently, in order to tow a motor driven vehicle, the operator must perform one of the following steps to eliminate potential drive line damage while towing at extended highway speeds: (1) disconnect the drive shaft for rear wheel drive wheels; (2) remove the drive shaft completely; or (3) install a clutch-type mechanism which remotely controls and disengages the drive shaft power transfer mechanism.

Another alternative is that a hydraulic pump may be installed in the vehicle which pressurizes the automatic transmission and lubricates the components within the transmission, thus avoiding lack of lubrication damage.

An additional alternative is to run the vehicle engine while under tow with the shift selector in neutral, thus supplying transmission lubricants for components for the automatic transmission. Alternately, the in-tow vehicle could be placed upon a two-dolly, thus removing the drive wheels from ground contact.

SUMMARY OF THE INVENTION

An important feature of the present invention is to provide a wheel hub assembly adapted to mount a vehicle wheel, the assembly being sometimes referred to as a tow wheel hub assembly adapted to any vehicle and easily installed on front or rear wheel drive motor cars or trucks. The wheel hub assembly employs a drive key which is removably splined to a wheel spindle and to the wheel hub so as to transmit a drive torque from the spindle to the hub for rotation in unison and wherein, with the drive key removed, power transfer will not occur through the vehicle drive line and spindle to the hub. Accordingly, the subject vehicle can be towed at all highway speeds without damage to the drive line components such as automatic or standard shift transmissions, transaxles, or differentials.

As a further feature, when the drive key is installed between the power-driven wheel spindle and wheel hub, power transfer from the spindle is restored and normal operation of the vehicle is available. The present wheel hub assembly is of such construction that in seconds the operator can choose the power mode or tow mode without special tools or mechanical skill.

A further feature is that the present wheel hub assembly can be removed from one wheel drive line and used on another vehicle, such as when a person is ready to sell or trade a vehicle.

A still further feature is to provide a wheel hub assembly which comprises a wheel spindle connectable to the power train of a vehicle rotatable upon a horizontal axis with the spindle including a shank having a first longitudinal spline therearound, a threaded portion intermediate its ends and a mount flange, wherein a cylindrical wheel hub adapted to mount a vehicle wheel is arranged coaxially of and surrounds the spindle and extends outwardly of the shank. In such a construction, bearings are interposed between the spindle and wheel hub, and a screw means upon the threaded portion retainingly engages the bearings, retaining the hub against endwise movement. A second spline is arranged upon the interior of the hub spaced from the first spline and is adapted to receive therebetween a cylindrical drive key having inner and outer longitudinal splines thereon registerable and interlocked with the first and second splines whereby the spindle and hub may rotate in unison with the key transmitting drive torque from the drive train to the hub. When the drive key is removed from the spindle and hub, the hub and the wheel thereon are adapted for free rotation independently of the drive spindle.

As another feature, there is provided an end cap upon the wheel hub which is removably secured thereon and is adapted to retain the drive key in its interlocked position between the spindle and the wheel hub.

Still another feature, upon removal of the end cap, the drive key is constructed so as to be manually removable and disengagable from the spindle and wheel hub so that upon towing of a vehicle, the wheel and wheel hub operate independently of the spindle and drive train.

These and other features and objects will be seen from the following specification and claims in conjunction with the appended drawings.

THE DRAWINGS

FIG. 6 is a cross-sectional view similar to FIG. 4 but with the endcap disc removed.

FIG. 7 is a fragmentary vertical section similar to FIG. 2 of an end portion thereof with the end cap unlocked and partly removed from the wheel hub.

FIG. 8 is a perspective view of the cam screw shown in FIG. 7.

FIG. 9 is a vertical section of an end portion of the wheel hub shown in FIG. 2 with the end cap removed and a hand tool inserted for retracting the drive key with respect to the spindle and wheel hub.

FIG. 10 is a section taken in the direction of arrows 10—10 of FIG. 9, the tool end plate apertures being in a clearance position relative to fasteners upon the drive key.

FIG. 11 is a view similar to FIG. 10 with the tool rotated a limited acute angle, and the corresponding apertures in the end face are in an interference position with respect to the fasteners on the drive key to facilitate retraction thereof.

It will be understood that the above drawings illustrate merely a preferred embodiment of the invention, and that other embodiments are contemplated within the scope of the claims hereafter set forth.

DETAILED DESCRIPTION OF A PREFERRED EMBODIMENT OF THE INVENTION

Figure 1:
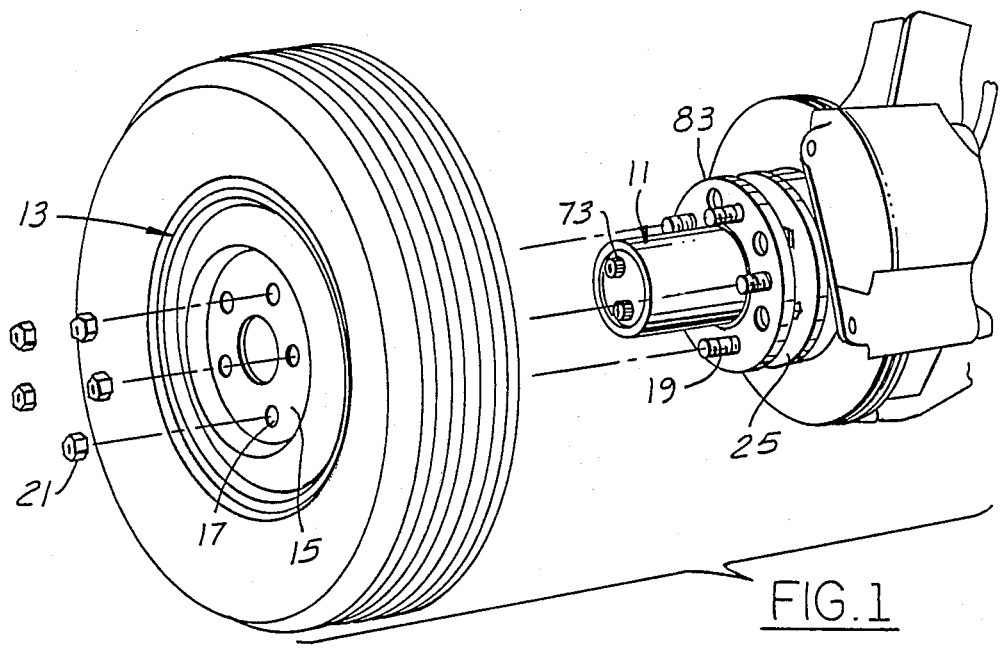
FIG. 1 is an exploded view of the present wheel hub assembly, with the wheel to be mounted thereon.

Referring to the drawings, FIG. 1, the present wheel hub assembly is generally indicated at 11, adapted to support the conventional wheel 13 having a transverse mount flange 15 with a series of spaced apertures 17 therein adapted to receive a corresponding series of similarly spaced lugs 19 with the wheel and flange held in place by the conventional lug nuts 21.

Figure 2:
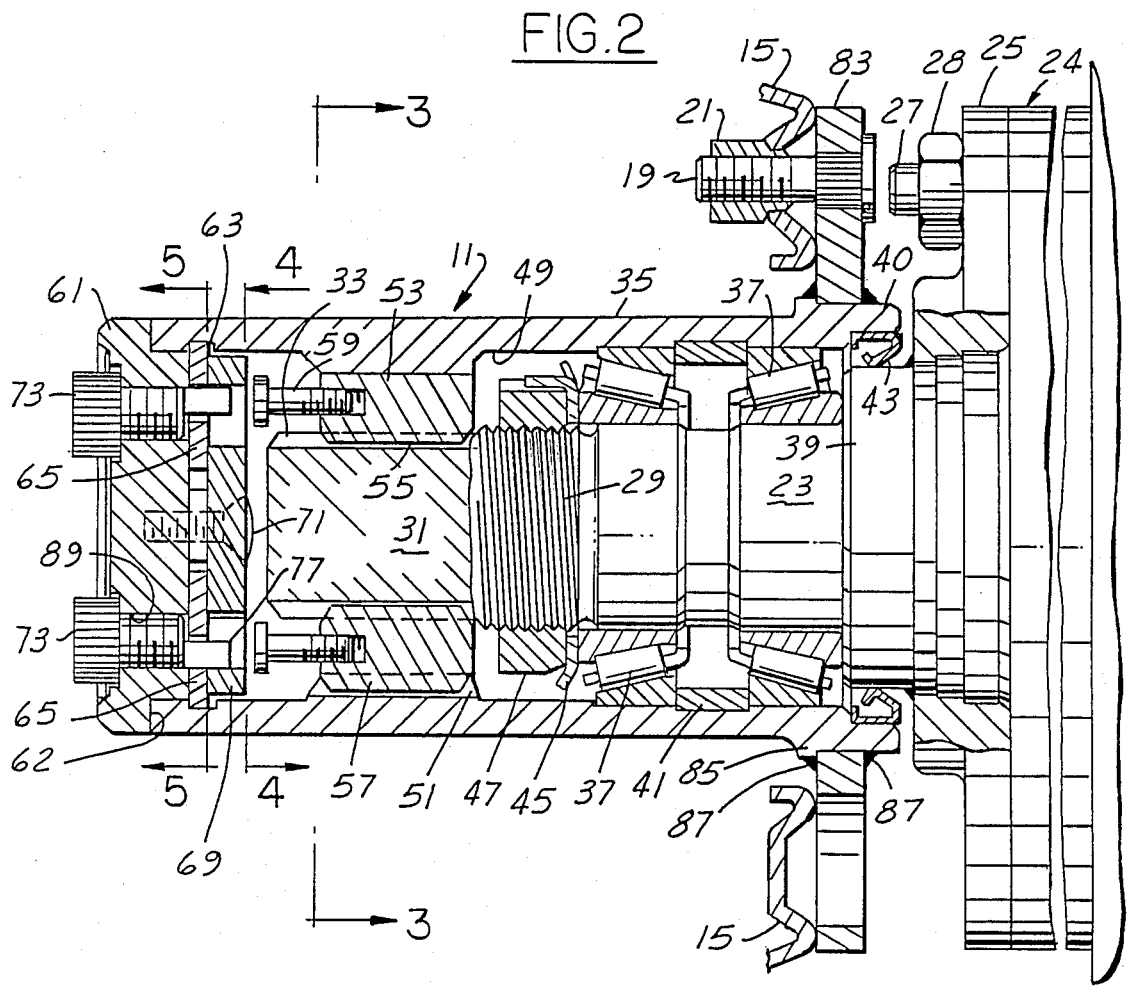
FIG. 2 is a fragmentary longitudinal section of the wheel hub assembly with the drive spindle connected to the vehicle drive train, partly broken away.

The present wheel hub assembly includes a spindle 23 mountable upon the drive train 24 for a vehicle and rotatable upon a horizontal axis. Annular mount flange 25, FIG. 2, is secured upon one end of the spindle 23 and receives a series of spaced lugs 27 which are connected to the vehicle drive train 24, fragmentarily shown. Mount flange 25 is secured by a series of nuts 28. The spindle 23 has a threaded portion 29 intermediate its ends which terminates in the shank 31 around which are a plurality of longitudinal splines 33.

The cylindrical wheel hub 35 having a longitudinal bore 49 is supportably mounted over and coaxially of spindle 23 with a bearing assembly 37 interposed. In the illustrative embodiment, the bearing assembly 37 includes a pair of spaced, tapered bearings 37 with a split locator ring 41 therebetween and nested within a corresponding recess within the bore 49 of wheel hub 35. The innermost bearing of the respective bearings 37 bears against shoulder 39 of the spindle 23.

One end of the wheel hub 35 terminates in an annular flange 40, FIG. 2, spaced from the spindle shoulder 39. A suitable lubricant seal 43 is interposed between flange 40 and spindle shoulder 39 to maintain any lubricant upon the interior of the wheel hub 35 with respect to the bearings 37 and for closing off that end of the bearing assembly from atmosphere.

A lock washer 45 is positioned over the threaded portion 29 of the spindle 23 against an outer portion of the bearings 37 and is adjustably retained thereon by the lock nut or fasteners 47, sometimes referred to as threaded means, which is threaded over the threaded portion 29 and is in operative retaining engagement with the bearings 37. The fastener or lock nut 47 further functions to retain the wheel hub 35 against longitudinal movement relative to spindle 23 except for such end play as is permitted.

The cylindrical wheel hub 35 encloses spindle 23 and extends outwardly thereof, FIG. 2, and has upon its interior a plurality of longitudinal splines 51 arranged in a circle and normally spaced radially outward from the corresponding first splines 33 upon shank 31 of spindle 23.

Figure 3:
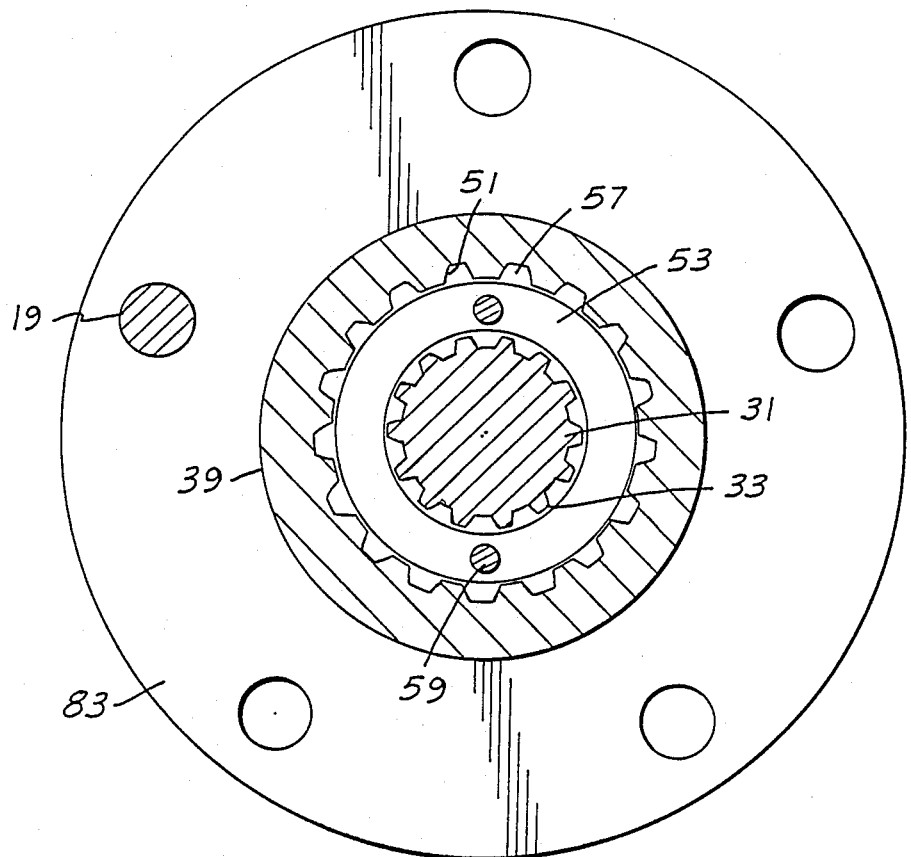
FIG. 3 is a section taken in the direction of arrows 3—3 of FIG. 2.

A cylindrically-shaped drive key 53 establishes a drive connection between spindle 23 and the cylindrical wheel hub 35. For this purpose, the drive key 53 has a series of circularly arranged internal splines 55 and a corresponding series of external splines 57 adapted for cooperative interlocking registry respectively with the corresponding spindle splines 33 and the hub splines 51. This assembly is shown in FIG. 3 so that there is a power drive connection between spindle 23 and its corresponding drive line 24 or transmission and the enclosing wheel hub 35 with the wheel 13 mounted thereon. There is a torque drive connection through the drive key 53 to the wheel hub 35 for normal driving of the vehicle.

Connected axially from one end of the drive key 53 are a pair of laterally spaced headed machine screws 59, FIG. 2, closely adjacent the removable end cap 61. The end cap 61 includes an annular flange or shoulder 62 which bears against one end of the wheel hub 35 and with a cylindrical portion of the end cap 61 projected into the bore 49 and extending past the annular groove 63 located upon the interior of the wheel hub 35. The annular groove 63, sometimes referred to as a lock channel, is adapted to receive the outer ends of a pair of coplanar oppositely arranged lock plates 65 adjustably mounted upon one end of the end cap 61, FIGS. 4, 5 and 6. The outer ends of the corresponding lock plates 65 are arcuate for cooperative registry within the lock channel 63 located upon the interior of the wheel hub 35.

Figure 4:
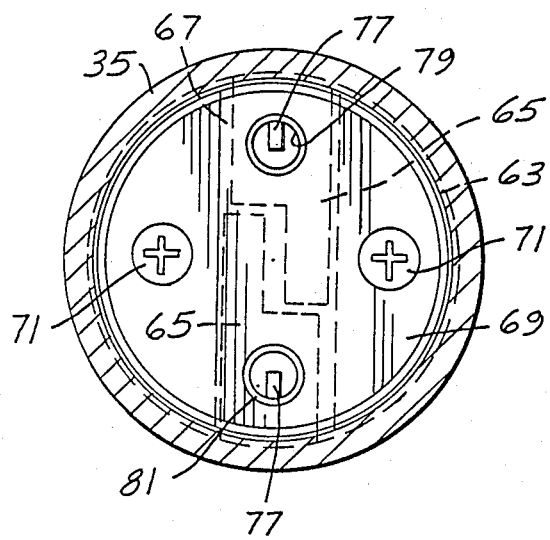
FIG. 4 is a section taken in the direction of arrows 4—4 of FIG. 2.
Figure 5:
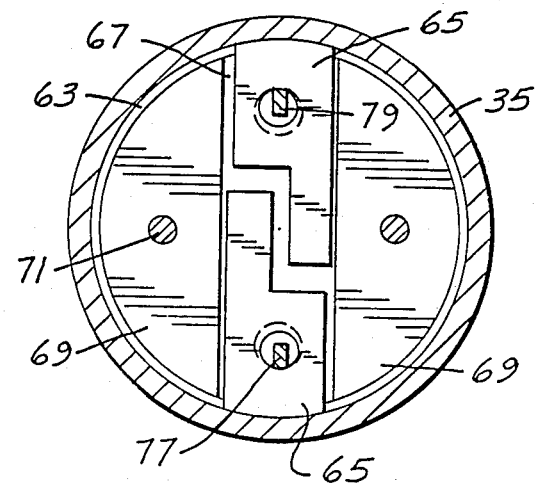
FIG. 5 is a section taken in the direction of arrows 5—5 of FIG. 2.

Mounted upon the inner end of end cap 61 is a retainer disc 69 having upon its interior surface a transverse slot 67 adapted to guidably receive the opposed coplanar lock plates 65, FIGS. 4, 5 and 6.

Outer portions of the retainer disc 69 retainingly bear against lock plates 65 so that the lock plates 65 are limited to advancing and retracting movements in a single plane transverse to the longitudinal axis of the spindle 23. Retainer disc 69 is secured to the inner end of the end cap 61 by a pair of fasteners 71.

A pair of spaced knurled cam fasteners 73 are axially threaded into end cap 61, FIG. 7. Each of the cam fasteners 73 includes a threaded shank 75 which is threaded into a corresponding threaded bore 89, within end cap 61 and with the respective shanks terminating in the cams 77. The respective cams 77 project into corresponding control apertures 79 formed adjacent the one end of the respective lock plate 65 so that upon manual rotation of the cam fastener 73, such as to the position shown in FIG. 7, the respective lock plates 65 are retracted. This permits removal of end cap 61 from one end of wheel hub 35.

The knurled heads for the respective cam fasteners 73 facilitate manual rotation thereof to a second locked position, FIG. 4, wherein the respective cams 77 have advanced the lock plates 65 so that their arcuate outer ends nest within the locking channel 63 within the wheel hub 35. Corresponding spaced apertures 81 are formed within the retainer disc 69 in order to receive the cams 77 in any rotated position thereof as in FIG. 7.

Mounted upon one end of the wheel hub 35 and against the annular shoulder 85 therein is the circular mount flange 83 secured in position as by the welds 87. A plurality of spaced lugs 19 are arranged in a circle, and positioned through flange 83 and secured thereto. The lugs 19 extend through wheel flange apertures 17, FIG. 1, and receive lugs 21.

When it is desired to tow a vehicle employing the present wheel hub assembly 11, it is necessary to manually remove the drive key 53 from its interlock position between spindle 23 and wheel hub 35.

For this purpose, there is provided in the illustrative embodiment, drive key removal tool 91 of cylindrical form which fits within the bore 49 of the wheel hub 35 such as to the position shown in FIG. 9. Removal tool 91 includes at one end a transverse handle aperture 93 through which a handle can be projected. The opposite end of the tool 91 includes a transverse end face 95 which includes a pair of diametrically opposed clearance recesses 97 adapted to receive the headed portions of the screws 59 as shown in FIGS. 9 and 10. Arranged within the transverse end face 95 of tool 91 are a pair of diametrically opposed second interference recesses 99 which are arranged at an acute angle to the first pair of recesses 97 which in the illustrative embodiment is 30 degrees. Recesses 99 communicate with recesses 97.

When the tool 91 has been rotated 30 degrees from the position shown in FIG. 10 to the position shown in FIG. 11, the corresponding interference recesses 99 retainingly engage the headed portions of the fasteners 59 upon the end of the drive key 53. This is shown at the lower portion of FIG. 9 and in FIG. 11. With such interconnection therebetween a slight rotating or longitudinal force applied to the tool 91 will longitudinally retract the drive key 53 and its corresponding splines 55 and 57 from the respective splines 33 and 51 from the spindle 23 and upon the interior of the wheel hub 35. Then the hub 35 is journaled upon the spindle 23 for free rotation independent of the spindle 23. This is referred to as the towing mode.

Having described my invention reference should now be had to the following claims.

I claim:

1. A wheel hub assembly comprising a spindle adapted for connection to a drive train for a vehicle and rotatable upon a horizontal axis, said spindle including a shank having a first longitudinal spline around said shank at one end thereof, a threaded portion intermediate its ends and an apertured mount flange at one end thereof;
    a cylindrical wheel hub having an axial bore and being adapted to mount a vehicle wheel having an apertured mount flange;
    said hub being coaxial of and surrounding said spindle and extending axially outwardly of said shank;
    bearing means mounted upon said spindle interposed between said spindle and wheel hub supportably and retainingly engaging said hub;
    screw means upon said threaded portion retainingly engaging said bearing means, retaining said hub against endwise movement relative to said spindle;
    a second spline upon and around the interior of said hub radially spaced from said first spline; and
    drive key means having inner and outer longitudinal splines thereon registerable with and interlocked with said first and second splines respectively, thereby said spindle and hub rotate in unison, with said drive key means adapted to transmit a drive torque to said hub.

2. A wheel hub assembly comprising a spindle adapted for connection to a drive train for a vehicle and rotatable upon a horizontal axis, said spindle including a shank having a first longitudinal spline around said shank, a threaded portion intermediate its ends and an apertured mount flange;
    a cylindrical wheel hub having an axial bore and being adapted to mount a vehicle wheel having an apertured mount flange;
    said hub being coaxial of and surrounding said spindle and extending axially outwardly of said shank;
    bearing means mounted upon said spindle interposed between said spindle and wheel hub supportably and retainingly engaging said hub;
    screw means upon said threaded portion retainingly engaging said bearing means, retaining said hub against endwise movement relative to said spindle;
    a second spline upon and around the interior of said hub radially spaced from said first spline;
    drive key means having inner and outer longitudinal splines thereon registerable with and interlocked with said first and second splines respectively, thereby said spindle and hub rotate in unison, with said drive key means adapted to transmit a drive torque to said hub; and
    said drive key means being removable from said spindle and hub with said hub journaled upon said spindle for free rotation independently of said spindle.

3. In the wheel hub assembly of claim 1, and an end cap projected into said hub bore and secured therein, retainingly engaging said drive key means against axial movement.

4. A wheel hub assembly comprising a spindle adapted for connection to a drive train for a vehicle and rotatable upon a horizontal axis, said spindle including a shank having a first longitudinal spline around said shank, a threaded portion intermediate its ends and an apertured mount flange;
    a cylindrical wheel hub having an axial bore and being adapted to mount a vehicle wheel having an apertured mount flange;
    said hub being coaxial of and surrounding said spindle and extending axially outwardly of said shank;
    bearing means mounted upon said spindle interposed between said spindle and wheel hub supportably and retainingly engaging said hub;
    screw means upon said threaded portion retainingly engaging said bearing means, retaining said hub against endwise movement relative to said spindle;
    a second spline upon and around the interior of said hub radially spaced from said first spline;
    dive key means having inner and outer longitudinal splines thereon registerable with and interlocked with said first and second splines respectively, thereby said spindle and hub rotate in unison, with said drive key means adapted to transmit a drive torque to said hub;
    an end cap projected into said hub bore and secured therein, retainingly engaging said drive key means against axial movement; and
    a pair of parallel spaced adjustable screw means connected to said drive key means and projecting axially therefrom for registry with said cap.

5. In the wheel hub assembly of claim 4, said adjustable screw means providing access to said drive key means for withdrawing it from said hub and spindle on removal of said cap.

6. A wheel hub assembly comprising a spindle adapted for connection to a drive train for a vehicle and rotatable upon a horizontal axis, said spindle including a shank having a first longitudinal spline around said shank, a threaded portion intermediate its ends and an apertured mount flange;
    a cylindrical wheel hub having an axial bore and being adapted to mount a vehicle wheel having an apertured mount flange;
    said hub being coaxial of and surrounding said spindle and extending axially outwardly of said shank;
    bearing means mounted upon said spindle interposed between said spindle and wheel hub supportably and retainingly engaging said hub;
    screw means upon said threaded portion retainingly engaging said bearing means, retaining said hub against endwise movement relative to said spindle;
    a second spline upon and around the interior of said hub radially spaced from said first spline;

drive key means having inner and outer longitudinal splines thereon registerable with and interlocked with said first and second splines respectively, thereby said spindle and hub rotate in unison, with said drive key means adapted to transmit a drive torque to said hub; and an end cap projected into said hub bore and secured therein, retainingly engaging said drive key means against axial movement;

the securing of said cap including a pair of oppositely arranged apertured retractable lock plates slidably mounted upon said cap for movements transverse to said axis; and cam means upon said cap to alternately advance and retract said lock plates, said plates when advanced being nested within an annular lock channel in said bore.

7. In the wheel hub assembly of claim 6, said cam means including a pair of spaced knurled cam fasteners threaded into said end cap with each fastener having a cam nested within an opening in one of the lock plates.

8. In the wheel hub assembly of claim 6, and a disc retainingly bearing against said lock plates and axially secured to said cap and having a transverse slotted portion guidably receiving said lock plates.

9. In the wheel hub assembly of claim 7, and a disc retainingly bearing against said lock plates and axially secured to said cap and having a transverse slotted portion guidably receiving said lock plates.

10. In the wheel hub assembly of claim 9, including there being a pair of diametrically opposed apertures through said disc receiving said cams upon said cam fasteners.

11. In the wheel hub assembly of claim 5, and a cylindrical drive key removal tool having a transverse apertured end face, projectable into said bore on removal of said end cap;

there being a first pair of diametrically opposed clearance recesses in said end face adapted to receive said adjustable screw means on said drive key means;

there being a second pair of diametrically opposed interference recesses in said end face communicating with and arranged at an acute angle to said first recesses;

rotation of said tool through said acute angle moving said second interference recesses so as to retainingly engage said screw means, to facilitate withdrawal of said drive key means from said spindle and hub.

12. In the wheel hub assembly of claim 1, an annular mount flange mounted over one end of said wheel hub and secured thereto and arranged upon said axis; and a plurality of spaced axially extending lug bolts mounted upon and secured to said wheel hub mount flange adapted for projection through corresponding apertures in the apertured mount flange upon the vehicle wheel for securing thereto.

13. In the wheel hub assembly of claim 1, said wheel hub at one end having an annular flange spaced from said spindle; and an annular lubrication seal yieldably nested and interposed between said hub flange and spindle, and closing off said bearing means from atmosphere.

14. In the wheel hub assembly of claim 1, said drive train including a rotated disc mounting a plurality of spaced lug bolts arranged in a circle, adapted to project through corresponding apertures in said spindle mount flange for securing thereto.

15. A wheel hub assembly adapted to be connected to a drive train for a vehicle when being towed to prevent the transfer of power from the drive train to the vehicle wheel which is mounted on the wheel hub assembly, comprising a spindle adapted for connection to a drive train for a vehicle and rotatable upon a horizontal axis, said spindle including a shank having a first longitudinal spline around said shank, a threaded portion intermediate its ends and an apertured mount flange;

a cylindrical wheel hub having an axial bore and being adapted to mount a vehicle wheel having an apertured mount flange;

said hub being coaxial of and surrounding said spindle and extending axially outwardly of said shank;

bearing means mounted upon said spindle interposed between said spindle and wheel hub supportably and retainingly engaging said hub, said hub being journaled upon said spindle for free rotation independently of said spindle;

screw means upon said threaded portion retainingly engaging said bearing means, retaining said hub against endwise movement relative to said spindle; and a second spline upon and around the interior of said hub radially spaced from said first spline;

with the space between said splines being adapted to receive a drive key means having inner and outer longitudinal splines thereon for registering and interlocking with said first and second splines respectively for changing from the towing mode to the power mode whereby said spindle and hub rotate in unison, with the drive key adapted to transmit a drive torque to said hub.

16. In the wheel hub assembly of claim 15, an annular mount flange mounted over one end of said wheel hub and secured thereto and arranged upon said axis; and a plurality of spaced axially extending lug bolts mounted upon and secured to said wheel hub mount flange adapted for projection through corresponding apertures in the apertured mount flange upon the vehicle wheel for securing thereto.

17. In the wheel hub assembly of claim 15, said wheel hub at one end having an annular flange spaced from said spindle; and an annular lubrication seal yieldably nested and interposed between said hub flange and spindle, and closing off said bearing means from atmosphere.

18. In the wheel hub assembly of claim 15, said drive train including a power rotated disc mounting a plurality of spaced lug bolts arranged in a circle, adapted to project through corresponding apertures in said spindle mount flange for securing thereto.

19. In the wheel hub assembly of claim 15, and an end cap projected into said hub bore and secured therein, adapted to retainingly engage a drive key when assembled against axial movement.

20. A wheel hub assembly adapted to be connected to a drive train for a vehicle when being towed to prevent the transfer of power from the drive train to the vehicle wheel which is mounted on the wheel hub assembly, comprising a spindle adapted for connection to a drive train for a vehicle and rotatable upon a horizontal axis, said spindle including a shank having a first longitudinal spline around said shank, a threaded portion intermediate its ends and an apertured mount flange;

a cylindrical wheel hub having an axial bore and being adapted to mount a vehicle wheel having an apertured mount flange;

said hub being coaxial of and surrounding said spindle and extending axially outwardly of said shank;

bearing means mounted upon said spindle interposed between said spindle and wheel hub supportably and retainingly engaging said hub, said hub being journaled upon said spindle for free rotation independently of said spindle;

screw means upon said threaded portion retainingly engaging said bearing means, retaining said hub against endwise movement relative to said spindle; and a second spline upon and around the interior of said hub radially spaced from said first spline;

with the space between said splines being adapted to receive a drive key means having inner and outer longitudinal splines thereon for registering and interlocking with said first and second splines respectively for changing from the towing mode to the power mode whereby said spindle and hub rotate in unison, with the drive key adapted to transmit a drive torque to said hub;

an end cap projected into said hub bore and secured therein, adapted to retainingly engage a drive key when assembled against axial movement; and a pair of parallel spaced adjustable screw means adapted to be connected to a drive key when assembled and projecting axially therefrom for registry with said cap.

21. In the wheel hub assembly of claim 20, said adjustable screw means providing access to a drive key when assembled for withdrawing it from said hub and spindle on removal of said cap.

22. A wheel hub assembly adapted to be connected to a drive train for a vehicle when being towed to prevent the transfer of power from the drive train to the vehicle wheel which is mounted on the wheel hub assembly, comprising a spindle adapted for connection to a drive train for a vehicle and rotatable upon a horizontal axis, said spindle including a shank having a first longitudinal spline around said shank, a threaded portion intermediate its ends and an apertured mount flange;

a cylindrical wheel hub having an axial bore and being adapted to mount a vehicle wheel having an apertured mount flange;

said hub being coaxial of and surrounding said spindle and extending axially outwardly of said shank;

bearing means mounted upon said spindle interposed between said spindle and wheel hub supportably and retainingly engaging said hub, said hub being journaled upon said spindle for free rotation independently of said spindle;

screw means upon said threaded portion retainingly engaging said bearing means, retaining said hub against endwise movement relative to said spindle; and a second spline upon and around the interior of said hub radially spaced from said first spline;

with the space between said splines being adapted to receive a drive key means having inner and outer longitudinal splines thereon for registering and interlocking with said first and second splines respectively for changing from the towing mode to the power mode whereby said spindle and hub rotate in unison, with the drive key adapted to transmit a drive torque to said hub;

an end cap projected into said hub bore and secured therein, adapted to retainingly engage a drive key when assembled against axial movement;

the securing of said cap including a pair of oppositely arranged apertured retractable lock plates slidably mounted upon said cap for movements transverse to said axis; and cam means upon said cap to alternately advance and retract said lock plates, said plates when advanced being nested within an annular lock channel in said bore.

23. In the wheel hub assembly of claim 22, said cam means including a pair of spaced knurled cam fasteners threaded into said end cap with each fastener having a cam nested within an opening in one of the lock plates.

24. In the wheel hub assembly of claim 22, and a disc retainingly bearing against said lock plates and axially secured to said cap and having a transverse slotted portion guidably receiving said lock plates.

25. In the wheel hub assembly of claim 24, and a disc retainingly bearing against said lock plates and axially secured to said cap and having a transverse slotted portion guidably receiving said lock plates.

26. In the wheel hub assembly of claim 25, there being a pair of diametrically opposed apertures through said disc receiving said cams upon said cam fasteners.

27. In the wheel hub assembly of claim 21, and a cylindrical drive key removal tool having a transverse apertured end face, projectable into said bore on removal of said end cap;

there being a first pair of diametrically opposed clearance recesses in said end face adapted to receive said adjustable screw means on a drive key when assembled;

there being a second pair of diametrically opposed interference recesses in said end face communicating with and arranged at an acute angle to said first recesses;

rotation of said tool through said acute angle moving said second interference recesses so as to retainingly engage said screw means, to facilitate withdrawal of said drive key from said spindle and hub.

28. A wheel hub assembly adapted to be connected to a drive train for a vehicle when being towed to prevent the transfer of power from the drive train to the vehicle wheel which is mounted on the wheel hub assembly, comprising a spindle adapted for connection to the drive train for a vehicle and rotatable upon a horizontal axis, said spindle including a shank having a first longitudinal spline around said shank at one end thereof and an apertured mount flange at the other end thereof;

a cylindrical wheel hub having an axial bore and being adapted to mount a vehicle wheel having an apertured mount flange;

said hub being coaxial of and surrounding said spindle and extending axially outwardly of said shank at said one end;

bearing means mounted upon said spindle interposed between said spindle and wheel hub supportably and retainingly engaging said hub;

a second spline upon and around the interior of said hub radially spaced from said first spline; and drive key means having inner and outer longitudinal splines thereon registerable with and interlocked with said first and second splines respectively, thereby said spindle and hub rotate in unison, with said drive key means adapted to transmit a drive torque to said hub.

* * * * *